United States Patent [19]

Yang

[11] Patent Number: 4,542,960

[45] Date of Patent: Sep. 24, 1985

[54] FRINGE-FIELD SWITCHED STORAGE-EFFECT LIQUID CRYSTAL DISPLAY DEVICES

[75] Inventor: Kie-Hsiung Yang, Somers, N.Y.

[73] Assignee: International Business Machines Corporation, Armonk, N.Y.

[21] Appl. No.: 394,015

[22] Filed: Jun. 30, 1982

[51] Int. Cl.⁴ ............................................. G02F 1/133
[52] U.S. Cl. ................... 350/336; 350/339 R
[58] Field of Search ................. 350/336, 334, 339 R; 355/3 R; 340/785

[56] References Cited

U.S. PATENT DOCUMENTS

| | | | |
|---|---|---|---|
| 3,787,110 | 1/1974 | Berreman et al. | 350/341 |
| 3,914,019 | 10/1975 | Byatt | 350/336 X |
| 4,200,361 | 4/1980 | Malvano et al. | 350/336 |
| 4,277,786 | 7/1981 | Waldron | 340/784 X |
| 4,370,194 | 1/1983 | Shaver et al. | 350/341 X |
| 4,386,836 | 6/1983 | Aoki et al. | 355/3 R |
| 4,429,955 | 2/1984 | Portmann | 350/336 X |
| 4,444,125 | 5/1984 | Clerc et al. | 340/779 X |

*Primary Examiner*—John K. Corbin
*Assistant Examiner*—David Lewis
*Attorney, Agent, or Firm*—Graham S. Jones, II; Thomas P. Dowd

[57] ABSTRACT

A four terminal liquid crystal display device includes orthogonally related row and column electrodes separated by a dielectric and disposed in respective sets above and below the liquid crystal medium. The electrodes in proximity to the LC medium are the column electrodes which have a small alternating square wave bias voltage $\pm V_o$ imposed therebetween so that a voltage of $2V_o$ magnitude is normally impressed across the LC medium. When an impulse voltage of magnitude $4V_o$ is impressed across the exterior row electrodes ($+2V_o$ and $-2V_o$ respectively), since the column electrodes are foraminated or have microapertures therethrough, the electric field established between the row and column electrodes in opposite sets, $3V_o$, extends through the microapertures into the LC medium to establish a fringe electric field normal to the surfaces of the column electrodes tending to retain the LC directors in the vertical position. This arrangement avoids the imposition of large voltages directly across the LC media and permits the application of low voltages to the electrodes and thereby increases the life of only the column LC media which are otherwise degraded by high voltages.

18 Claims, 6 Drawing Figures

FRINGE-FIELD SWITCHED STORAGE-EFFECT LIQUID CRYSTAL DISPLAY DEVICES

TECHNICAL FIELD

This invention relates generally to a liquid crystal display (LCD) device, and more particularly to a nematic LCD device having a storage effect.

This invention is related to commonly assigned, copending U.S. patent application Ser. No. 381,281 by K.-H. Yang filed May 24, 1982 entitled "Weak Boundary Storage Liquid Crystal Display Devices".

BACKGROUND ART

Conventional direct-view field effect liquid crystal display (LCD) devices, such as twisted nematic (TN) displays and guest-host (GH) displays having dichroic dyes as the guest material in nematic or cholesteric hosts, are known. These conventional LCD devices have limited multiplex capacity because of a high $V_{on}/V_{th}$ ratio, where $V_{on}$ and $V_{th}$ are the root-mean-square voltages for the device to be turned on and when the device is at threshold voltage, respectively. Furthermore, conventional nematic LCD devices have no storage effect, so that direct pel (picture element) drive or refresh circuits are necessary for their operation. For these reasons, in general, conventional nematic LCD devices are suitable only in display applications of the low information content type, such as digital watch displays.

To achieve greater versatility field effect LCD cells, such as the TN type, have been constructed. In such cells a liquid crystal material having a positive dielectric anisotropy is interposed between a pair of (upper and lower) parallel glass substrates, with the molecules of the LC material paralleled with the upper and lower substrates and twisted 90° therebetween. Such an LCD cell is disposed between a pair of polarizers with polarizing axes intersecting with each other at right angles. With this typical construction, light impinging upon the device is first polarized linearly by one of the polarizers. Then its polarized plane is rotated 90° by the liquid crystal molecules in a twisted arrangement and finally light transmits through the other polarizer. Where transparent electrodes formed with a pattern of a letter, digits, or other symbols are disposed on the inner surfaces of the upper and lower substrates, and are impressed with a voltage greater than the threshold voltage of the device, the LC (Liquid Crystal) molecules will be arranged in substantially the vertical direction or in the direction of the field. Under these conditions, the polarized plane of incident light will be intercepted by the analyzer. Thus the pattern can be displayed by controlling the direction of the LC medium within the LC cell to yield a transmission and an interception of the light.

Smectic liquid crystal display devices having a storage effect also known. This type of LCD device provides an indefinite storage of the information in the form of scattering regions in an otherwise clear background. More specifically, information is recorded by an intensity modulated laser beam which heats the LC material locally to create light-scattering centers. For more details see, for instance, "Laser-Addressed Liquid Crystal Projection Displays", by A. G. Dewey et al, pp. 1–7, Proceeding of the S.I.D., Vol. 19/1 (1978).

Optical storage effects in mixtures of nematic and cholesteric materials with negative dielectric anisotropy were observed and reported by Heilmeier and Goldmacher, Proceedings IEEE 57, 34 (1969). According to Heilmeier et al, a sample with no applied voltage was initially in a relatively clear state. The application of a DC or a low frequency AC voltage of a sufficient magnitude induced an intense scattering known as dynamic scattering. When the voltage was removed, the dynamic scattering disapppeared, but a quasi-permanent forward scattering stage remained. The storage decay time was reported to be on the order of hours. Furthermore, the scattering state could be erased and returned to the clear state by the application of an audio frequency signal.

The effects of weak boundary coupling on liquid crystal display performance is reported in an article by J. Nehring et al entitled, "Analysis of Weak-Boundary-Coupling Effects in Liquid-Crystal Displays" J. of Applied Physics 47, 850 (1976). According to the article, the multiplexing capacity of LCD devices can be improved by controlling the liquid crystal material-to-substrate anisotropy.

Heretofore several types of surface treatment techniques have been employed and applied in the making of liquid crystal display devices. For instance, in U.S. Pat. No. 4,140,371 entitled, "Liquid Crystal Display Devices", and issued to M. Kanazaki et al, an LCD device is described in which liquid crystals are oriented slightly inclined by the use of an orientation controlling structure formed by rubbing or oblique vapor deposition.

In order to control the alignment of the molecules of a liquid crystal material, some prior LCD devices employ surfactant coatings. For instance, in U.S. Pat. No. 3,967,883 entitled, "Liquid Crystal Devices of the Surface Aligned Type", and issued to D. Meyerhofer et al, it is described that one or more inside surfaces of an LCD device enclosure is coated with successive, slant-evaporated layers for the purpose of controlling the alignment of the molecules of the liquid crystal material.

Another prior LCD device employing the surface rubbing technique is described in U.S. Pat. No. 4,083,099 entitled, "Manufacture of a Twisted Nematic Field Effect Mode Liquid Crystal Display Cell", and issued to K. Yano et al. According to the patent, the surface of the transparent insulating film of the LCD device is rubbed to form micro-grooves aligned in a predetermined direction. The two glass substrates of the LCD device carry these transparent insulating films having micro-grooves formed using this rubbing technique. In addition, the application of this rubbing technique to promote the uniformity of the LCD optical effect is also mentioned and appreciated by M. Biermann, et al, in U.S. Pat. No. 3,892,471 entitled, "Electrodes for Liquid Crystal Components".

The effects of surface treatment on the liquid crystal material-to-substrate anisotropy is described in an article entitled, "Anisotropic Interactions Between MBBA and Surface-Treated Substrates", by S. Naemura, pp. C3-514-518, Journal De Physique, Colloque C3, supplement au no. 4, Tome 40. The article reported the measurements of the easy axis and anchoring strength coefficient between MBBA and substrates with various surfactants layers.

U.S. Pat. No. 4,028,692 of Ngo for "Liquid Crystal Display Device" requires no refresh because storage is provided.

U.S. Pat. No. 4,228,449 of Braatz for "Semiconductor Diode Array Liquid Crystal Device" describes an LC device incorporating semiconductor diodes with a storage mode.

U.S. Pat. No. 3,936,816 of Murata et al for "Flat Display System" shows a display system with row electrodes and column electrodes. The display elements can be LC devices, but no memory effect is described.

It will be seen from a careful consideration of all the foregoing art that there exists a need for an improved direct-view, high information content LCD device having convenient addressability along with an inherent storage effect.

SUMMARY OF THE INVENTION

It is a principal object of this invention to provide an improved direct-view, high information content nematic liquid crystal display (LCD) device.

It is a further object of this invention to provide a four-terminal LCD cell having convenient addressability combined with an inherent storage effect.

It is another object of the present invention to provide a low voltage, low power LCD cell having no requirement for refresh circuitry for its proper operation.

It is also an object of the present invention to provide a storage effect twisted nematic (TN) LCD cell.

It is still another object of the present invention to provide a storage effect nematic homogeneous LCD cell.

A four terminal liquid crystal display device in accordance with the invention includes two sets of orthogonally related row and column electrodes separated by dielectric on their respective surfaces above and below the interposed liquid crystal medium. The electrodes in proximity to the LC medium are the column electrodes which are foraminated or have microapertures therethrough which permit the electric field established between the row and the column electrodes in each set to extend through the microapertures into the LC medium to establish a fringe electric field normal to the surface of the column electrodes tending to retain the LC directors in the vertical position. This permits the application of low voltages to the electrodes and thereby increases the life of the LC media which are otherwise degraded by high voltages.

In accordance with this invention, the liquid crystal display device includes at least one cell having a memory effect comprising:

first and second parallel arrays of column electrodes;

a liquid crystal material contained between the first and second arrays of column electrodes, first and second parallel arrays of row electrodes respectively disposed outwardly of the extending orthogonally to the first and second arrays of column electrodes;

the fifrst array of column electrodes being isolated from the first array of row electrodes by a first thin dielectric layer;

the second array of column electrodes being isolated from the second array of row electrodes by a second thin dielectric layer;

a pair of parallel housing plates and means for sealing the plates together for containing the row and column electrodes and the liquid crystal material with at least one of the plates being optically transparent; wherein the column electrodes are electrically porous such that when potentials are applied to the row and column electrodes fringe fields may be produced in the boundary layers of the liquid crystal material to overcome the anisotropic surface anchoring force whereby the memory effect is achieved by these fringe fields when appropriate potentials are applied to the row and column electrodes.

A typical display device comprises an array of the liquid crystal display cells, with these column electrodes composed of a porous material.

Preferably the column electrodes may each be composed of a foraminated structure, and more particularly, it is desirable that the foraminated structure comprise conducting grids with nonconducting voids. Alternatively, the column electrodes may each be composed of a segmented structure, which preferably comprises a set of fine parallel conducting stripes.

In any event, it is desirable that the column electrodes have surfaces with mechanical characteristics enhancing the wall surface anchoring force applied to the liquid crystal material anisotropically.

Therefore, the surface of each column electrode in the first and second arrays of the column electrodes preferably comprises a matrix of apertures in the form of micropores therethrough.

The foregoing and other objects, features and advantages of this invention will be apparent from the following more particular description of the best mode for carrying out the invention, as illustrated in the accompanying drawings.

BRIEF DESCRIPTION OF THE DRAWINGS

The details of the invention will be described in connection with the accompanying drawings, in which.

DESCRIPTION OF THE PREFERRED EMBODIMENT

Conventional liquid crystal devices (LCD) operated by electric field switching which provide a direct view of the liquid crystals have limited multiplex capability. The limitation in multiplex capability is caused by the large ratio of the RMS turn on voltage ($V_{on}$) to the threshold voltage ($V_{th}$) where $V_{on}/V_{th}$ is greater than or equal to 1.25. Such conventional LCD devices include twisted nematic (TN), dichroic dyes in guest-host/nematic (GH-N), or in guest-host/cholesteric (GH-C) liquid crystal media.

As a result such conventional LCD's with their large $V_{on}/V_{th}$ ratios are suitable for use only for the display of images with low information content applications such as digital watches. It is too expensive to employ these LCD's for the display of information content greater than two lines of about two hundred characters because of the limited multiplex addressing capability. [See Alt and Pleshko, IEEE Trans. Elec. Dev. E.D.-21, 990 (1973)]. Furthermore, such LCD's are inadequate because they include no memory capacity so that direct pel drive or refresh circuits for refreshing the signals to the display are necessary for their operation.

This invention relates to a new type of LCD display which incorporates a memory effect retaining the displayed data for a predetermined time. This is particularly useful for directly viewable high information content displays. We have named these display devices Fringe Field Switching Liquid Crystal Displays (FFSLCD). These FFSLCD devices operate based on the fringe-field switching of an LC boundary layer adhering to the wall of the LC cell in addition to the bulk switching of conventional LCD devices.

Figure 2:
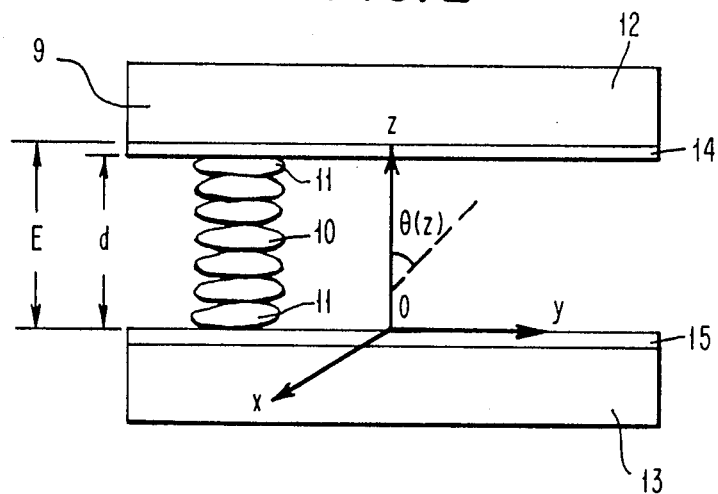
FIG. 2 is a schematic diagram of a display cell with liquid crystal directors shown parallel to the walls of the display cell.

In accordance with this invention the LC medium contacts a wall along the x-axis from $x=0$ to x approaching infinity. The layer of molecules of LC medium in contact with the wall is strongly anchored to the wall surface anisotropically with LC directors comprising local unit vectors indicating the average direction of orientation of the LC molecules along their lengths parallel to the surface of the wall (FIG. 2). If a uniform electric field E is applied to the LC medium along its x-axis in the position direction where $$0 < \epsilon_a/\epsilon_{11} << 1$$

where $\epsilon_a$ and $\epsilon_{11}$ are the LC dielectric anisotropy and the LC dielectric constant parallel to the director, respectively, by solving the elastic deformation equation in one dimension which follows:

$$(1/\xi_m)^2 (d^2\theta(x)/dx^2) - \sin\theta(x) \cos\theta(x) = 0$$

or $$\frac{1}{\xi_m^2} \frac{d^2\theta(x)}{dx^2} - \sin\theta(x) \cos\theta(x) = 0$$

$$\theta(x) = 2 \tan^{-1} [\exp(-x/\xi_m)] x \geq 0 \qquad (1)$$

where $$\xi_m = \frac{1}{E} \sqrt{\frac{K}{\epsilon_a}},$$

K is the LC splay elastic constant, and $\theta(x)$ is the angular orientation of an LC director as a function of x ($\theta = 0$ is parallel to x-axis). If the LC-to-wall surface anchoring is isotropic, then the solution will be $$\theta(x) = 0 \text{ for } x \geq 0 \qquad (2)$$

Figure 1:
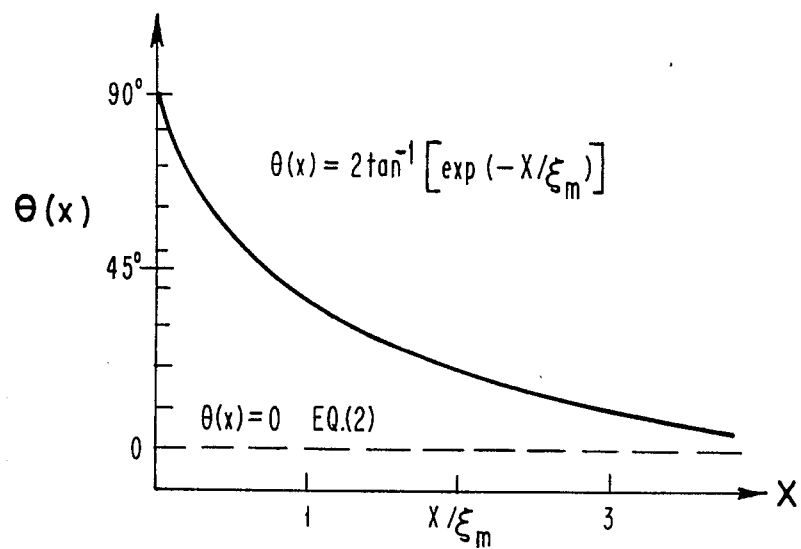
FIG. 1 is a plot of $\theta(x)$ as a function of $x/\xi_m$ for both the relationship between the electric field force which acts upon liquid crystals on the surface of an electrode and the anisotropic surface anchoring force acting on the liquid crystals. The lower curve is that for an isotropic liquid crystal to surface anchoring force.

FIG. 1 depicts the results of Eqs (1) and (2). In the first case [Eq. (1)], the LC is subjected to two forces, a force due to the electric field and an anisotropic surface anchoring force. The balancing of the two forces creates strain in the LC medium. The strain energy per unit area in the LC medium can be calculated as $$\frac{S}{A} = \frac{K}{2} \int_0^\infty \left(\frac{d\theta(x)}{dx}\right)^2 dx = \frac{1}{2} E \sqrt{K\epsilon_a} \qquad (3)$$

In the solution of Eq. (2), there is no strain energy deposit in the LC medium because there is no anisotropic surface anchoring force to balance the force due to the electric field so that the LC directors are aligned parallel to the electric field to minimize the free energy. The free energy difference per unit area between Strong Anisotropic Surface Anchoring (SASA) (Eq. (1)) and Isotropic Surface Anchoring (ISA) (Eq. (2)) is $$\frac{F}{A} = 2\frac{S}{A} = E\sqrt{K\epsilon_a} \qquad (4)$$

If F/A is greater than the strong anisotropic surface anchoring (SASA) energy $Fa_s$ (i.e., the electric field is strong enough to overcome the SASA force) the molecules in the LC layer adjacent to the wall surface will flip their director orientation from parallel (as shown in FIG. 2) to perpendicular to the surfaces of the walls of plates 12 and 13. The director orientation equation is switched from Eq. (1) to Eq. (2). Typical anisotropic surface anchoring energy ranges from 1 erg/cm$^2$ to $10^{-3}$ erg/cm$^2$, [sec E. Guyon and W. Urbach in "Nonemissive Electrooptic Displays" edited by A. R. Kmetz and F. K. Von Willisen, P121, Plenum Press (1976)]. If we assume $Fa_s = 1$ erg/cm$^2$, the SASA condition, the corresponding electric field required to flip the orientation of the directors, of the boundary LC layer is $E_c \approx 0.75 \times 10^6$ V/cm.

In the SASA case, if we apply $E < E_c = 0.75 \times 10^6$ V/cm on the LC medium first to align the LC molecules as described by Eq. (1) and later remove the applied electric field, the LC molecules will relax back to the case where their LC directors are aligned parallel to the wall surface to release the strain energy. Now, consider an SASA case in which one applies an electric field $E_m < E_c$ to the LC medium first. Eq. (2) will describe the LC director orientation with corresponding constant $\xi_m$.

Then, a strong surface electric field impulse $E_s{}^i > E_c$ parallel to $E_m$ is applied on the LC molecule layer adjacent to the wall surface to overcome the SASA energy of the wall. The $\theta(x)$ will flip from Eq. (1) to Eq. (2) and will maintain this state after the surface electric field impulse is removed if $$E_m \geq E_c \sin^2 \phi \approx 0.2 E_c \qquad (5)$$

Equation (5) is derived based on the assumption that [Rapini and Papoular J. Phys. (Paris) 30 C4-54, (1969)]:

$$Fa_s = W \sin^2 \theta(x=0) \qquad (6)$$

and $$P = \frac{1}{2} <3 \cos^2 \phi - 1> \qquad (7)$$

where P is the order parameter of the nematic LC molecules and P=0.72 [W. Maier and A. Saupe, Z. Naturfor Schg. 14a 882 (1959) and 15a 287 (1960)] at room temperature and TnT=100° C. After $E_s{}^i$ is removed, the LC layer molecules adjacent to the wall surface have a tendency to restore their LC directors back parallel to the wall due to the thermal fluctuation of the LC director orientation. But this tendency is reduced due to the LC long range interaction force which tends to keep the LC directors uniformly aligned along the x-axis. The electric field $E_m$ has to be greater or equal to 0.2 $E_c$ to enforce the directors to align along the x-axis.

Now consider the case of FIG. 2 in which a nematic LC medium is confined within the space between two conducting-film coated glass plates separated by distance d (cell spacing). The LC directors 10 in the cell 9 in FIG. 2 are aligned parallel to the glass plate walls 12 and 13 (coated with conducting films 14 and 15) under homogeneous boundary condition due to the SASA force described by Eq. (6). FIG. 2 depicts this situation. The deformation of LC directors in the cell by an externally applied electric field has been solved by Rapini and Papoular, supra. There exists a threshold electric field $E_{th}$, below which no deformation occurs, and above which the deformation of the LC director orientation starts at the middle of the cell and propagates toward the wall as the applied field increases further beyond $$E_{th}{}^{(s)} = \frac{\pi}{d} \sqrt{\frac{K}{\epsilon_a}} \qquad (8)$$

In the SASA case, biasing the cell 9 with an uniform electric field E such that $0.5 \times E_{th}{}^{(s)} < E < E_{th}{}^{(s)}$, the LC is in a quiescent state. If a surface electric field impulse greater than $E_c \approx 0.75 \times 10^6$ V/cm is applied to both the wall surfaces and flips the LC directors 11 adjacent to the walls 12 and 13 into the perpendicular direction, the LC directors 10 throughout the cell 9 will align parallel to E. The LC directors 10 will remain in this activated state and have a memory effect after the surface field impulse is removed. When E is removed, the LC directors 10 in the cell 9 will relax back to the original homogeneous orientation.

In a twisted nematic LC cell with SASA boundary conditions the formula to calculate the threshold field is similar to Eq. (8) except that it takes a different value of elastic constant.

Figure 3:
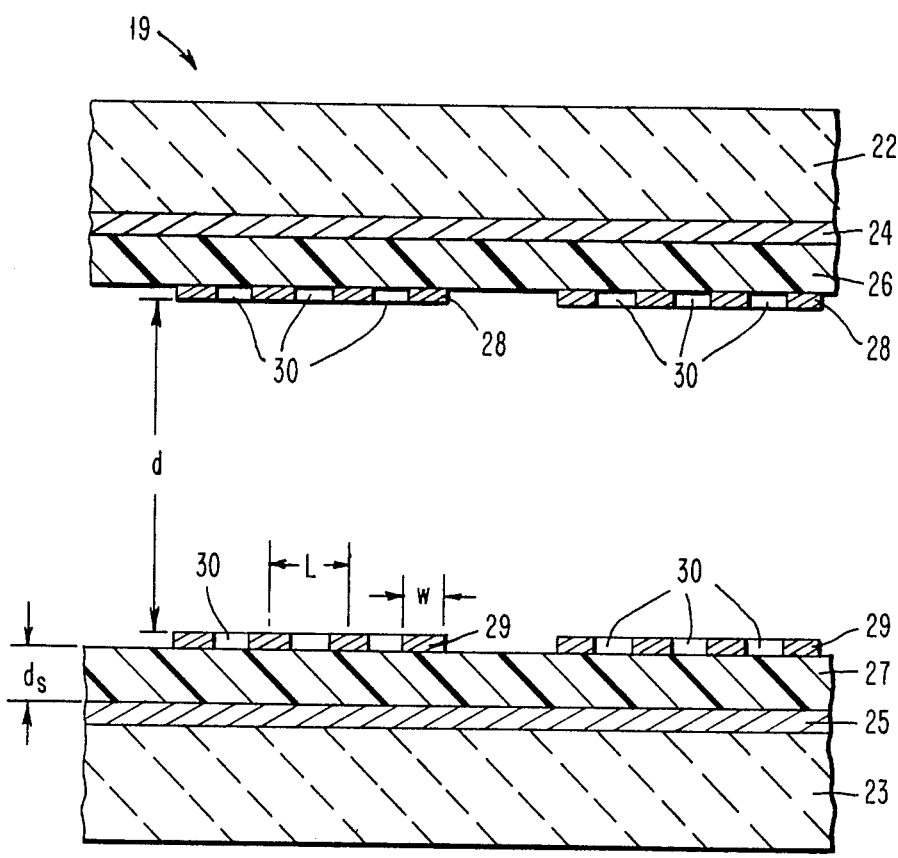
FIG. 3 is a schematic diagram of a four terminal display device in accordance with this invention.
Figure 4:
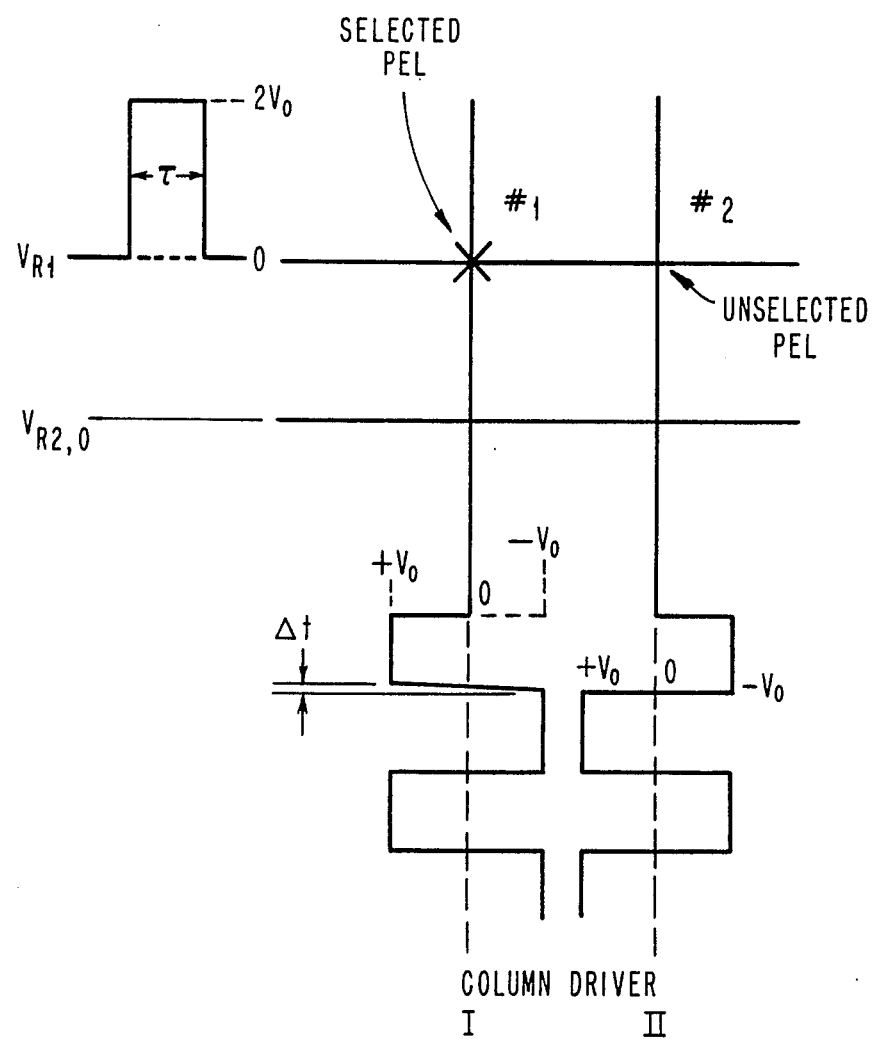
FIG. 4 is a diagram of the row and column lines for the first and second pel positions of a cell, with the voltages applied indicated on the lines for the two pels.

The conventional LCDs including TN, GH-N and GH-C have a common cell structure. The cell is a two-terminal device in the sense that the LC is sandwiched between two electrodes which are fabricated on two pieces of glass serving as the LC container. The FFSLCD cell 19 of this invention is a four-terminal device and its schematic is shown in FIG. 3. The LC containing cell 19 is composed of two pieces of glass 22 and 23 on which arrays of stripes of row electrodes 24 and 25 are evaporated. The width of each row electrode 24, 25 is from 0.127 mm to 2.5 mm depending on the display resolution chosen. The upper array of row electrodes 24 is transparent to visible light and the lower row electrodes 25 can be transparent (for TN configuration) or reflective (for GH-N or GH-C configurations). Upon each of those arrays of row electrodes 24, 25 are fabricated a set of uniform transparent dielectric layers 26, 27 with thickness ranges from a few hundred angstroms to a few micrometers. Arrays of transparent column electrodes 28, 29 are then deposited on top of the respective dielectric layers 26, 27. The width of each column electrode 28 and 29 is similar to that of the row electrodes 24, 25. Each column electrode 28, 29 is not a piece of uniform conducting film. It consists of either a segmented structure of parallel fine conducting stripes (width < few microns) or a foraminated (mesh-like) structure (with small pores or perforations, extending completely through the column electrodes to permit the fringe electric fields to extend through the surfaces of the column electrodes into the LC media, on the order of 0.2 $\mu$m to 5. $\mu$m in size) such as conducting grids with square, circular or hexagonal non-conducting voids 30. The LC liquid is filled in between the segmented or foraminated column electrodes. There are several ways to apply the voltage waveform to operate the device. The following is an example. Assume a TN LC configuration with homogeneous boundary condition and the SASA case. The foraminated column electrodes are connected to signal drivers which output square wave AC voltage such that, when $+V_o$ appears on the top column electrode 28, then $-V_o$ appears on the corresponding bottom column electrode 29 and vice versa. The non-strobing top and bottom row electrodes 24, 25 are at zero voltage. The magnitude of $V_o$ is selected according to two criteria. It is (1) below the threshold voltage of the LC cell and (2) its fringe field, leaking through the non-conducting voids 30 in column electrodes 28, 29, and the dielectric layers 26, 27 to the adjacent row electrodes, is less than $E_c = 0.75 \times 10^6$ V/cm so that the fringe field is not large enough to flip the boundary LC layer from the homogeneous to homeotropic condition. Regarding the first criterion, one can also change the $E_{th}{}^{(s)}$ (or threshold voltage) of a TN cell according to Eq. (8) by tailoring the LC material with a different $\epsilon_a$. In the strobing row electrodes 24, 25, a single square wave with magnitude 2 $V_o$ is applied on the top row electrode 24 and $-2 V_o$ on the bottom row electrode 25. For simplicity, two rows and two columns of the crossed arrays are shown in FIG. 4 as disposed on the surface of the top glass 22. The voltage waveform is shown for the top row 24 and the top column electrodes 28 only. By symmetry, the corresponding voltage waveforms on the bottom row and the bottom column electrodes 25, 29 have the reverse polarity. The pel #1 represents the selected pel and is turned on and remains on after the strobe pulse. The requirement of the 2 $V_o$ magnitude is to satisfy the condition that, when the voltage drop between the top row and column electrodes 24, 28 at the turned-on pel is 3 $V_o$, most of the fringe field at that pel, appearing on the surface of the foraminated column electrode 28, is greater than $E_c \sim 0.75 \times 10^6$ V/cm to flip the boundary LC layer from homogeneous into homestropic condition. Due to this flip, the threshold voltage across #1 pel is suddenly lowered to a value less than $|2 V_o|$ so that this pel is turned on and remains on. The pel #2 represents a non-selected element. At this pel position, the corresponding voltage is $V_o$ whose fringe field is below $E_c$ so that this pel cannot be turned on since the LC directors of the boundary LC layer are not flipped to lower the threshold field across the LC sample. Detailed dimensions on ds (dielectric thickness), d (cell spacing: spacing between column electrode arrays), L (dimension of voids or holes 30 on a mesh-type conducting column electrode), and W (the width of conducting-mesh lines on a mesh-type conducting column electrode), as shown in FIG. 3, can be calculated and fabricated when different LC material and surface anchoring methods are chosen.

The cell structure as shown in FIG. 3 is also suitable using GH-N and GH-C configurations. The LC-to-surface anchoring condition can also be adjusted. The corresponding dimensions of the cell structure and the voltage waveform can also be selected for their operations.

Combining the structure of the top or bottom substrate as shown in FIG. 3 with a conventional piece of conducting-film coated glass to form an LC cell with, respectively, different surface anchoring treatments for each substrate is also comprehended by this invention. In this case, the flipping of a single LC director boundary layer is enough for the operation of the FFSLCD.

Figure 5:
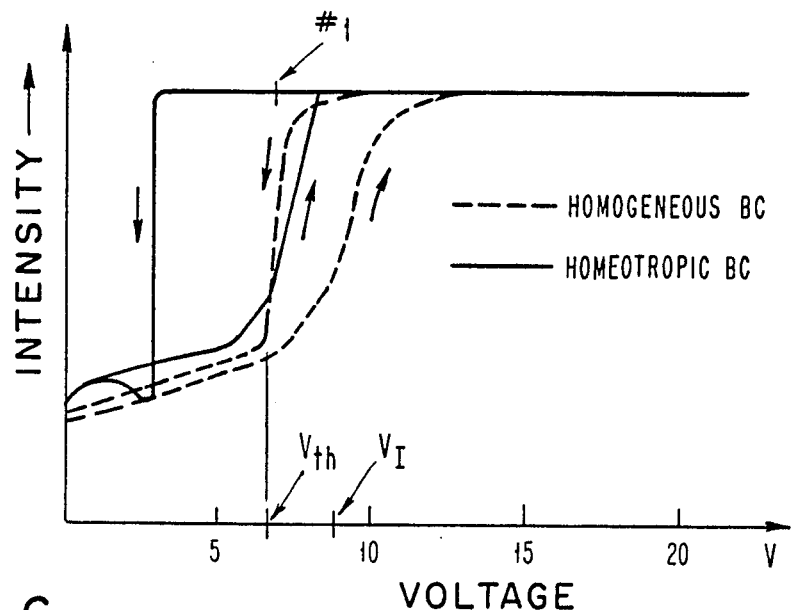
FIG. 5 is a graph of intensity vs voltage for both homogeneous and homeotropic boundary conditions (BC) with the threshold voltage shown, for a cholesteric dye system.

Above, the basic concept, the device fabrication and the operation of FFSLCD (Fringe Field Switching Liquid Crystal Displays) are described. This section describes methods for improving the storage time and contrast ratio of FFSLCD using dichroic dyes in cholesteric LC as the display medium. The name of the fringe-field-switched storage dichroic dyes in cholesteric liquid crystal display will be abbreviated as FFSGH-C. The conventional dichroic dyes in cholesteric LC display will be abbreviated as the W-T cell. The light transmission of a transmitting W-T cell as a function of the applied root-mean-square voltage is sketched in FIG. 5 for both homeotropic perpendicular and homogeneous (parallel) boundary conditions. As shown in FIG. 5, there exists a threshold voltage $$V_{th} = \frac{\pi^2}{p} \sqrt{\frac{K_2}{\epsilon_a}} \times d \qquad (9)$$

for both boundary conditions, where P, $K_2$, and $\epsilon_a$ are the pitch, the twist elastic constant, and the dielectric anisotropy of the cholesteric LC, respectively. The cell spacing is denoted by d. Eq. (9) is derived without reference to the boundary conditions. However, when the applied voltage exceeds $V_{th}$, the increase in the light transmission for the case of the homogeneous boundary condition is much slower than that of the homeotropic boundary condition. This is expected because the homogeneous boundary condition adds hindrance for the LC to align parallel to the electric field.

Now assume a FFSGH-C with the homogeneous boundary condition using a line-at-a-time, three-to-one, matrix addressing scheme. The column drivers deliver a root-mean-square voltage $V_o$ on each quiescent LC pel at the beginning. If $V_o = V_{th}$, the selected pel on the strobing row has 3 $V_o$ across its electrodes.

This pel is turned on during the strobe pulse. After the strobe pulse, the transmission of this on-pel will be shown as point #1 on the solid curve of FIG. 5. (In operating the FFSGH-C, the boundary condition is changed from the homogeneous to the homeotropic by the fringe field). This point is on the hysteresis loop of the solid curve. It represents a meta-stable state and is transformed into the scattering focal-conic state by the gradual generation of nucleation centers within the LC or from the boundary. The life time of this state is difficult to predict, control, and reproduce. The same argument holds if $V_o$ lies within the range shown as $V_{th}$ to $V_1$ in FIG. 5.

Figure 6:
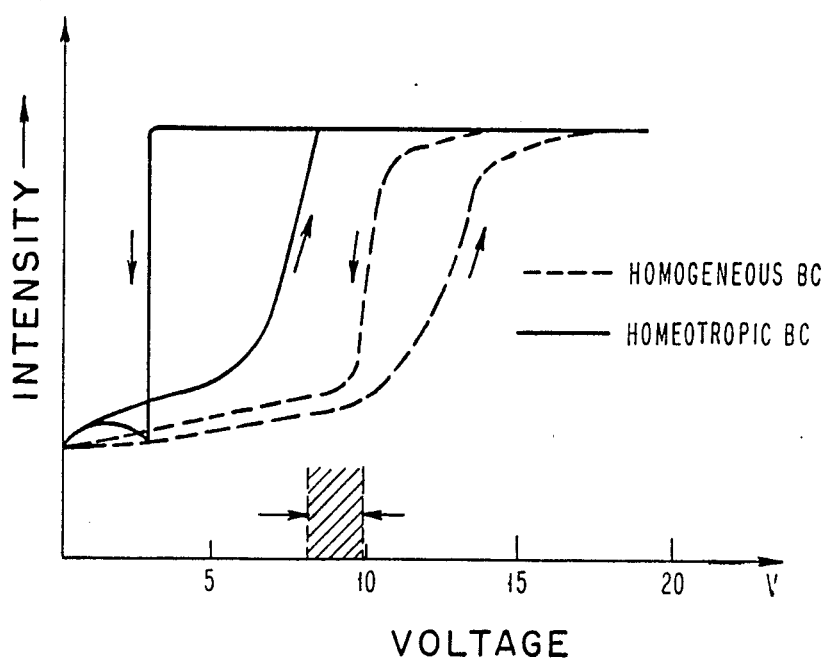
FIG. 6 is a similar graph to FIG. 5 showing the effects of employing a 90 degree twist homogeneous boundary condition on the cholesteric dye system.

If $V_o$ assumes a value greater than $V_1$, the storage effect of the turned-on pel is improved with the tradeoff of degrading the contrast ratio. In order to improve both the storage time and the contrast ratio of FFSGH-C, we can shift the dashed curve as shown in FIG. 5 to a higher voltage region as shown in FIG. 6. This can be done by imposing a 90° twist homogeneous boundary condition on the cholesteric dye system such that the imposed twist is in the same direction as the natural cholesteric helix. $V_o$ can take a value in the region shown as the shaded area in FIG. 6 to improve both the contrast ratio and the storage time of FFSGH-C.

The value of $\tau$ in FIG. 4 is within the range of 5–50 milliseconds. The frequency of the column voltage should be in the range from 10 Hz to 100 Hz. More importantly $\Delta t$ as shown for the column voltage transition from low to high (vice versa) must be shorter than about 2 milliseconds to minimize the tendency of the LC directors to change orientation. The fringe fields passing through the pores 30 in the column electrodes 28 and 29 from the row electrodes 24 and 25 are vertical to hold the LC directors in the vertical position subsequent to the row voltage pulse. The voltage at the row electrodes returns to ground potential subsequent to the pulse, but the column driver square wave provides the voltage which maintains a reversing vertical fringe field through the pores 30. The pulse of 2 $V_o$ on the row electrodes plus $V_o$ on the column driver, as described above, is strong enough to produce a stronger fringe field which moves the boundary layer of LC directors to the vertical position. The fringe field technique described above eliminates the need of high electrode voltages and high fringe fields which greatly shorten the life of the LC media.

Having thus described my invention, what I claim as new, and desire to secure by Letters Patent is:

1. A liquid crystal display device including at least one cell having a memory effect comprising:

first and second arrays of column electrodes spaced from each other in parallel planes;

a liquid crystal material contained between said first and second arrays of column electrodes and having respective boundary layers contacting the inner surfaces of said column electrodes;

first and second arrays of row electrodes respectively disposed in parallel planes in proximity to the outer surfaces of, and extending orthogonally to, said first and second arrays of column electrodes;

a first thin dielectric layer disposed between and isolating said first array of column electrodes from said first array of row electrodes;

a second thin dielectric layer disposed between and isolating said second array of column electrodes from said second array of row electrodes; and a pair of parallel housing plates for containing said arrays of row and column electrodes and said liquid crystal material therebetween, at least one of said plates being optically transparent;

and wherein each column electrode in said first and second arrays of column electrodes is porous such that potentials applied to said row and column electrodes are capable of producing electrical fringe fields at the porous inner surface of each said column electrode tending to retain the directors of said liquid crystal boundary layers normal to said inner surfaces in the regions of said fringe fields;

whereby said memory effect may be achieved by said fringe fields when appropriate potentials are applied to said arrays of row and column electrodes.

2. A device in accordance with claim 1 comprising an array of said one cells.

3. A device in accordance with claim 1 wherein each of said column electrodes comprises a material having a matrix of micropores therethrough.

4. A device in accordance with claim 1 wherein each of said column electrodes comprises conducting grids with nonconducting voids.

5. A device in accordance with claim 1 wherein each of said column electrodes comprises a set of fine parallel conducting stripes.

6. A device in accordance with claim 1 wherein each of said column electrodes has an inner surface with mechanical characteristics enhancing the wall surface anchoring force applied to said liquid crystal material anisotropically.

7. A device in accordance with claim 1 wherein said potentials applied to said column electrodes comprise alternating current square waves having a magnitude Vo and said potentials applied to said row electrodes comprise square wave pulses having a magnitude 2 Vo and wherein the threshold voltage of said liquid crystal material Vth is equal to or greater than Vo.

8. A device in accordance with claim 1 further comprising means for applying potentials to said row and column electrodes sufficient to produce fringe fields strong enough to overcome the strong anisotropic surface anchoring force and orient said directors of said liquid crystal boundary layers normal to said inner surfaces of said column electrodes.

9. A device in accordance with claim 8 further comprising means for maintaining potentials on said row and column electrodes of a magnitude less than said sufficient potentials to retain the directors of said liquid crystal boundary layers normal to said inner surfaces of said column electrodes after the application of said sufficient potentials.

10. A device in accordance with claim 9 wherein said sufficient potentials are sufficient to create an electric field in said liquid crystal material of a magnitude equal to or greater than $0.75 \times 10^6$ V/cm.

11. A method of producing a liquid crystal display having a memory effect comprising the steps of:
providing first and second arrays of column electrodes spaced from each other in parallel planes;
disposing a liquid crystal material between said first and second arrays of column electrodes and having respective boundary layers contacting the inner surfaces of said column electrodes;
providing first and second arrays of row electrodes respectively disposed in parallel planes in proximity to the outer surfaces of, and extending orthogonally to, said first and second arrays of column electrodes;
disposing respective thin dielectric layers between and isolating said first arrays of row and column electrodes and said second arrays of row and column electrodes;
applying housing plates to the outer surfaces of said arrays of row electrodes for containing said arrays of row and column electrodes and said liquid crystal material therebetween, at least one of said plates being optically transparent;
rendering each column electrode in said first and second arrays of column electrodes porous; and
applying electrical potentials to said arrays of row and column electrodes sufficient to produce fringe fields in the boundary layers of said liquid crystal material in contact with the porous inner surfaces of said column electrodes to overcome the anisotropic surface anchoring force, whereby the directors of said liquid crystal boundary layers are retained normal to said inner surfaces.

12. A method in accordance with claim 11 wherein each of said column electrodes is rendered porous by forming a matrix of micropores passing therethrough.

13. A method in accordance with claim 11 wherein each of said column electrodes is rendered porous by forming them as grids.

14. A method in accordance with claim 11 wherein each of said column electrodes is rendered porous by forming them as fine parallel stripes.

15. A method in accordance with claim 11 wherein said liquid crystal material comprises cholesteric liquid crystal containing dichroic dyes and further comprising the step of imposing a 90° twist homogeneous boundary condition on the cholesteric dye system in the same direction as the natural cholesteric helix.

16. A method in accordance with claim 11 wherein said potentials applied to said column electrodes comprise alternating current square waves having an rms magnitude Vo and said potentials applied to said row electrodes comprise square wave pulses having a magnitude 2 Vo and wherein the threshold voltage of said liquid crystal material Vth is equal to or greater than Vo.

17. A method in accordance with claim 11 comprising the further step of maintaining potentials on said row and column electrodes of a magnitude less than said sufficient potentials to retain the directors of said liquid crystal boundary layers normal to said inner surfaces of said column electrodes after the application of said sufficient potentials.

18. A method in accordance with claim 17 wherein said sufficient potentials are sufficient to create an electric field in said liquid crystal material of a magnitude equal to or greater than $0.75 \times 10^6$ V/cm.

* * * * *